US012583582B2

(12) United States Patent
Syrovy

(10) Patent No.: US 12,583,582 B2
(45) Date of Patent: Mar. 24, 2026

(54) VTOL TRANSPORT CLUSTERS

(71) Applicant: George J. Syrovy, Centerville, MA (US)

(72) Inventor: George J. Syrovy, Centerville, MA (US)

(73) Assignee: George J. Syrovy, Centerville, MA (US)

( * ) Notice: Subject to any disclaimer, the term of this patent is extended or adjusted under 35 U.S.C. 154(b) by 0 days.

(21) Appl. No.: 18/575,517

(22) PCT Filed: Jul. 11, 2022

(86) PCT No.: PCT/US2022/036706

§ 371 (c)(1),
(2) Date: Dec. 29, 2023

(87) PCT Pub. No.: WO2023/287715

PCT Pub. Date: Jan. 19, 2023

(65) Prior Publication Data

US 2025/0002146 A1     Jan. 2, 2025

Related U.S. Application Data

(60) Provisional application No. 63/359,707, filed on Jul. 8, 2022, provisional application No. 63/220,080, filed on Jul. 9, 2021.

(51) Int. Cl.
B64U 10/60         (2023.01)
B64C 29/00         (2006.01)
(Continued)

(52) U.S. Cl.
CPC ........ B64C 39/022 (2013.01); B64C 29/0033 (2013.01); B64U 10/20 (2023.01);
(Continued)

(58) Field of Classification Search
CPC ... B64C 37/02; B64C 39/022; B64C 29/0033; B64D 3/00; B64D 5/00; B64U 10/14;
(Continued)

(56) References Cited

U.S. PATENT DOCUMENTS 2,400,400 A * 5/1946 Buren ...................... B64D 3/00
                                                         244/3
3,113,747 A    12/1963 Smith
                      (Continued)

FOREIGN PATENT DOCUMENTS

CA          3087379 A1 * 1/2022
DE    102019208630 A1 * 12/2020    ............... B64B 1/40
                      (Continued)

OTHER PUBLICATIONS

International Search Report to corresponding PCT/US2022/036706 mailed Feb. 14, 2023.
                      (Continued)

*Primary Examiner* — Joshua E Rodden
(74) *Attorney, Agent, or Firm* — Sandberg Phoenix & von Gontard, P.C.

(57)          ABSTRACT

A heavier-than-air aircraft is enabled or aided in vertical take-off by a plurality of vertical take-off and landing (VTOL) aircraft attached to the heavier-than-air aircraft by tethers and flying in formation. In embodiments, the tethers comprise winches. In embodiments, the VTOL aircraft are attached individually to points on the heavier-than-air aircraft spaced both laterally and in the direction of flight.

8 Claims, 5 Drawing Sheets

(51) Int. Cl.

| | |
|---|---|
| *B64C 39/02* | (2023.01) |
| *B64U 10/14* | (2023.01) |
| *B64U 10/20* | (2023.01) |
| *B64U 101/61* | (2023.01) |
| *B64U 101/67* | (2023.01) |

(52) U.S. Cl.
CPC .............. *B64U 10/60* (2023.01); *B64U 10/14* (2023.01); *B64U 2101/61* (2023.01); *B64U 2101/67* (2023.01)

(58) Field of Classification Search
CPC .... B64U 10/20; B64U 10/60; B64U 2101/61; B64U 2101/67
USPC ....................................................... 244/110 F
See application file for complete search history.

(56) References Cited

U.S. PATENT DOCUMENTS

| | | | |
|---|---|---|---|
| 4,267,987 A | | 5/1981 | McDonnell |
| 5,333,814 A * | | 8/1994 | Wallis ........................ F41J 9/10 |
| | | | 244/3 |
| 6,783,096 B2 * | | 8/2004 | Baldwin ............... B64C 11/001 |
| | | | 244/66 |
| 8,308,142 B1 | | 11/2012 | Olson |
| 9,205,922 B1 * | | 12/2015 | Bouwer ................... B64D 9/00 |
| 9,630,712 B1 * | | 4/2017 | Carmack ................ B64U 50/13 |
| 9,958,876 B2 * | | 5/2018 | Vander Lind ........... G01S 19/51 |
| 10,150,524 B2 | | 12/2018 | Evans |
| 10,173,777 B1 * | | 1/2019 | Carmack ................ B64U 10/25 |
| 10,308,358 B2 | | 6/2019 | Phan et al. |
| 10,329,015 B2 * | | 6/2019 | DeBey ..................... B64D 3/00 |
| 10,538,323 B2 * | | 1/2020 | Rancourt ................ B64C 19/02 |
| 10,773,799 B1 * | | 9/2020 | Thrun .................... B64U 10/60 |
| 11,034,443 B2 | | 6/2021 | Frolov et al. |
| 11,319,065 B2 * | | 5/2022 | Usman ................... B64U 10/10 |
| 11,319,069 B1 * | | 5/2022 | Lim ........................ G05D 1/695 |
| 11,500,120 B2 * | | 11/2022 | Døssing Andreasen et al. ........... |
| | | | B64D 3/00 |
| 11,845,188 B2 * | | 12/2023 | Kim ................. G05B 19/41895 |
| 2007/0187547 A1 * | | 8/2007 | Kelly ........................ B64B 1/20 |
| | | | 244/7 R |
| 2009/0299551 A1 * | | 12/2009 | So ........................... G05D 1/104 |
| | | | 701/3 |
| 2013/0008998 A1 | | 1/2013 | Morris et al. |
| 2013/0037650 A1 * | | 2/2013 | Heppe ..................... B64C 37/02 |
| | | | 244/2 |
| 2014/0001308 A1 * | | 1/2014 | Costa Duarte Pardal ................... |
| | | | B64B 1/02 |
| | | | 244/29 |
| 2017/0297672 A1 * | | 10/2017 | Heppe ........................ B64B 1/00 |
| 2019/0217952 A1 * | | 7/2019 | Zawadzki ................ B64D 1/02 |
| 2020/0160730 A1 | | 5/2020 | Priest |
| 2020/0182310 A1 | | 6/2020 | Rancourt et al. |
| 2020/0369382 A1 * | | 11/2020 | Thrun ..................... B64C 37/02 |
| 2020/0387178 A1 | | 12/2020 | Vander Lind et al. |
| 2021/0276712 A1 * | | 9/2021 | Suzuki .................. B64D 47/00 |
| 2021/0300557 A1 * | | 9/2021 | Oshima .................. B64U 10/14 |
| 2024/0286773 A1 * | | 8/2024 | Humann ............... B64U 10/60 |

FOREIGN PATENT DOCUMENTS

| | | | | |
|---|---|---|---|---|
| JP | 6603847 B1 * | 11/2019 | .......... | B64C 39/022 |
| WO | WO-2018028956 A1 * | 2/2018 | ............ | B64C 31/02 |
| WO | WO-2020247870 A1 * | 12/2020 | .......... | B64C 39/022 |

OTHER PUBLICATIONS

Written Opinion to corresponding PCT/US2022/036706 mailed Feb. 14, 2023.
International Search Report to corresponding PCT/US2022/036706 mailed Mar. 10, 2023.

* cited by examiner

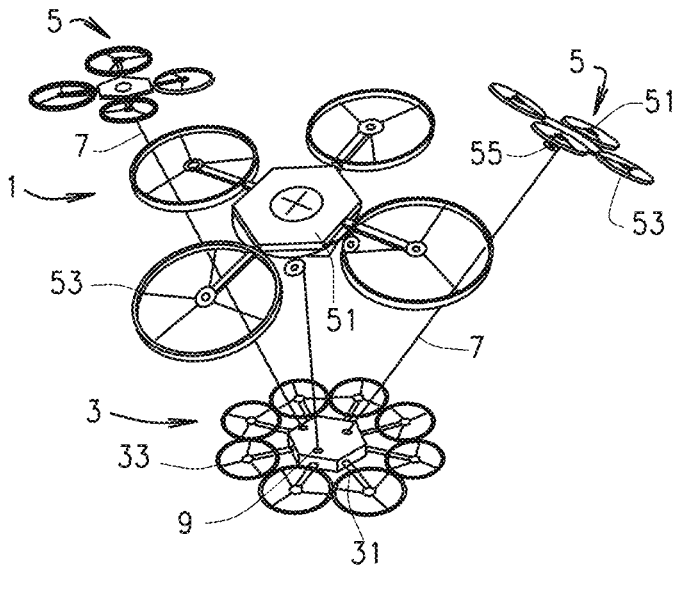
F I G . 1
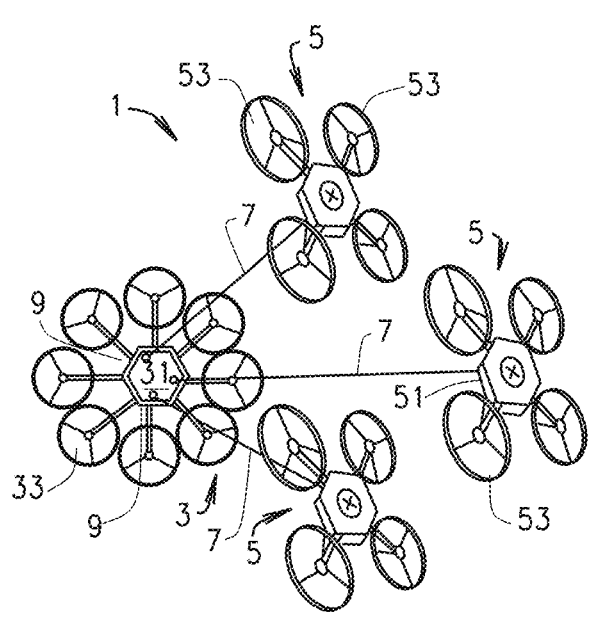
F I G . 2

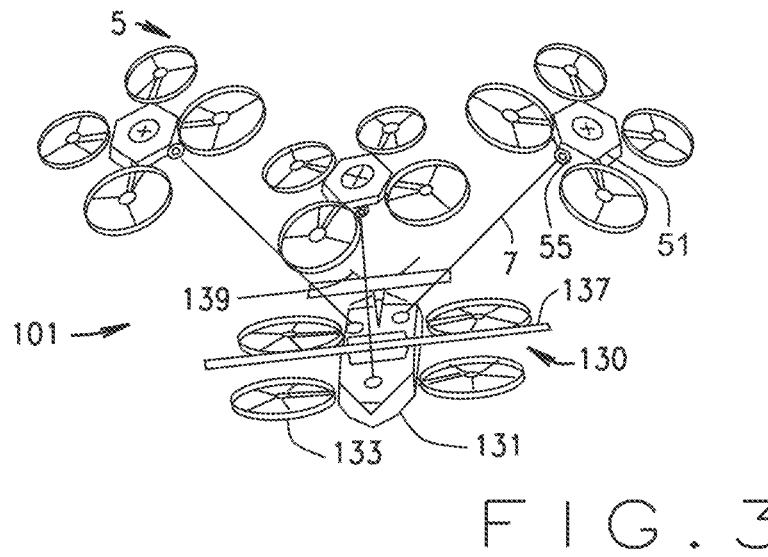
F I G . 3
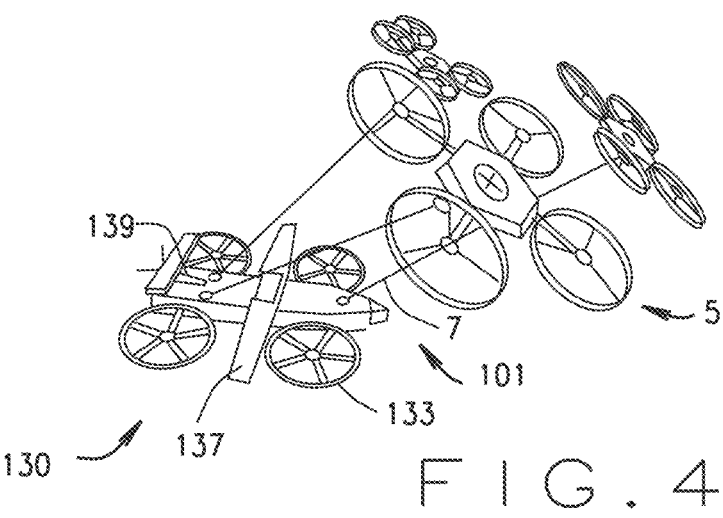
F I G . 4
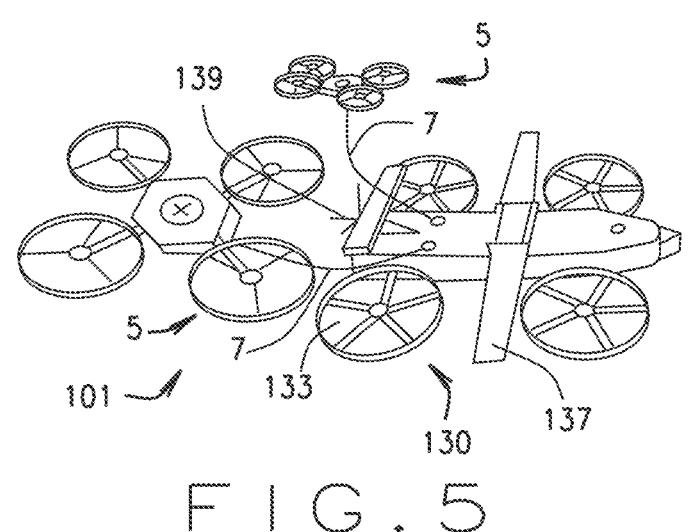
F I G . 5

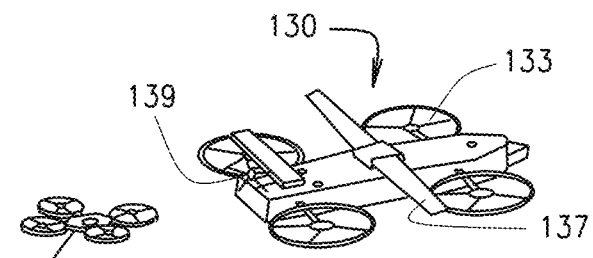
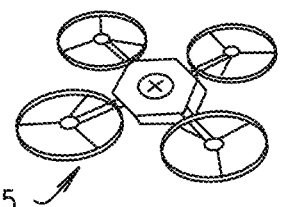
F I G . 6
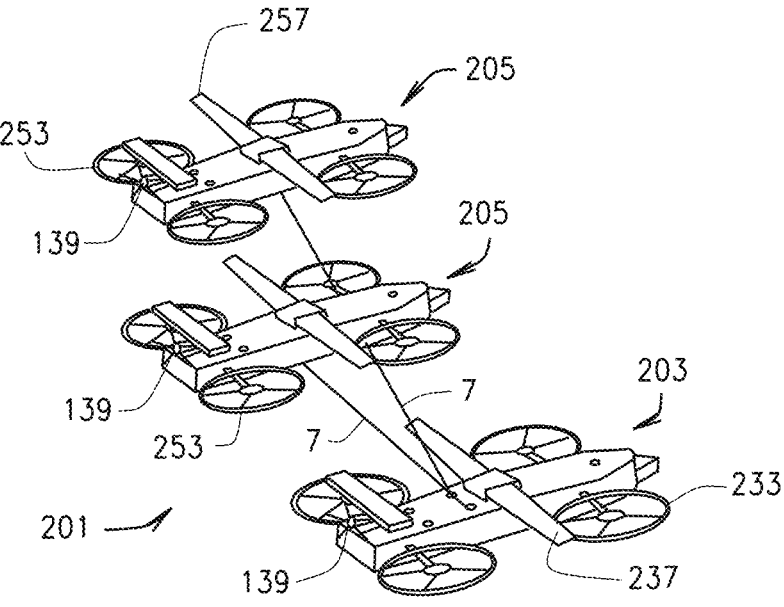
F I G . 7

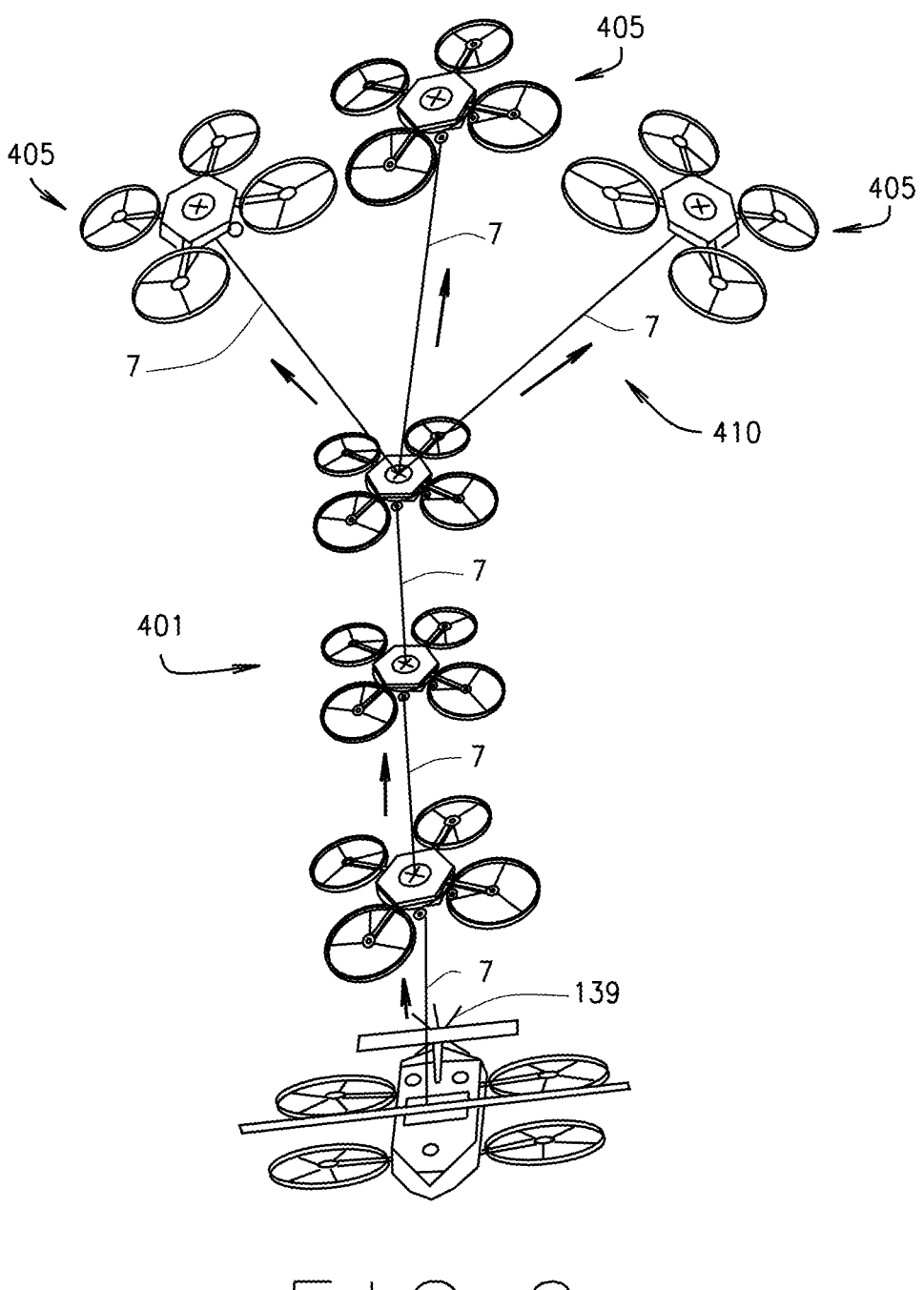
F I G . 9

VTOL TRANSPORT CLUSTERS

CROSS REFERENCE TO RELATED APPLICATIONS

This is a national stage application of International Application PCT/US2022/036706, filed Jul. 11, 2022, claiming priority to U.S. Provisional Patent Application 63/220,080, filed Jul. 9, 2021, and to U.S. Provisional Patent Application 63/359,707, filed Jul. 8, 2022, the disclosures of which are hereby incorporated in their entirety by reference.

STATEMENT REGARDING FEDERALLY SPONSORED RESEARCH OR DEVELOPMENT

Not applicable.

BACKGROUND

This invention relates to heavier-than-air aircraft, and in particular to such aircraft capable of substantially vertical take-off and landing (VTOL aircraft).

Inherent limitations on range, speed, efficiency, and payload, among others, have been major constraints on the use of helicopters.

Since 1950's there have been many efforts to develop a concept combining the VTOL advantage of helicopters with advantages of the winged airplane's superior flight speed, range, height, and fuel efficiency, as well as its large payload and passenger capacity. There has been no real success so far. The Army MV22 "Osprey" dual tilt-rotor aircraft came closest in its forty years of development. However, during transition from horizontal flight to vertical flight, by slowing the speed of the aircraft and pivoting the rotor assemblies from horizontal airplane mode to vertical helicopter mode, "wing-borne" lift force decreases exponentially faster than the increasing lift force now generated by its slow tilting rotors, causing instabilities. Similar, but less severe, instabilities occur during transition from helicopter mode to winged airplane mode during take-off.

Numerous proposals have been made for "passenger drones" capable of carrying a single passenger. These craft are generally electrically powered VTOL aircraft (eVTOL aircraft) usually modeled on multirotor unmanned drones. These passenger drones have limited range (under fifty miles) and speed (under one hundred fifty miles per hour) and are therefore primarily potentially useful for urban transportation. Attempts to scale up the load capacity of passenger drones, or to increase their range, have been largely unsuccessful. Examples of urban passenger drones and their control may be found in Priest, U.S. Patent Publication 2020/0160730 and the patents and published applications from which it claims priority, Frolov et al., U.S. Pat. No. 11,034,443, Evans, U.S. Pat. No. 10,150,524, and Phan et al., U.S. Pat. No. 10,308,358.

BRIEF SUMMARY OF THE INVENTION

In accordance with one embodiment of the present invention, a heavier-than-air aircraft capable of carrying passengers or cargo, comprising a propulsion system which provides an upward force on the heavier-than-air aircraft while the heavier-than-air aircraft is not moving horizontally is connected to at least one VTOL aircraft capable of vertical takeoff and landing by a tether so as to enable the at least one VTOL aircraft to aid in lifting the heavier-than-air aircraft. In embodiments, the at least one VTOL aircraft comprises a plurality of VTOL aircraft, each individually connected to the heavier-than-air aircraft by its own tether.

In embodiments, the VTOL aircraft is or are electric VTOL (eVTOL) aircraft. In embodiments, the VTOL aircraft is or are multirotor drones. In embodiments, the plurality of VTOL aircraft provide at least some of the lift required for vertical take-off of the heavier-than-air aircraft and fly in formation during initial flight phases. In embodiments, the plurality of VTOL aircraft are unmanned. In embodiments, the plurality of VTOL aircraft are remotely controlled by humans or by artificial intelligence (AI); in other embodiments they are autonomously controlled by AI. In embodiments, the at least one VTOL aircraft comprises a cluster of VTOL aircraft connected to a single tether. In embodiments, the at least one VTOL aircraft comprises a plurality of VTOL aircraft connected in series to each other. In embodiments, the plurality of VTOL aircraft are configured and controlled to act as a swarm of aircraft; in those embodiments, each element in the swarm of aircraft may include a cluster of VTOL aircraft.

In embodiments, the tether or tethers are over twenty feet long, so as to isolate the heavier-than-air aircraft from substantial downwash from the VTOL aircraft. Shorter tethers may be used when the VTOL aircraft are angled slightly away from the heavier-than-air aircraft.

In embodiments, the heavier-than-air aircraft has wings. In embodiments, the heavier-than-air aircraft carries one or more passengers. In embodiments, one or more of the VTOL aircraft also carries passengers. In embodiments, the tethers are cables.

Because VTOL aircraft, especially those intended for short flights, such as passenger drones, will not be able to fly above the weather and are therefore particularly subject to turbulence, it is useful to provide mechanisms to stabilize the heavier-than-air aircraft. In embodiments, the tethers include at least one shock absorber, such as an air-piston shock absorber. In embodiments, at least some of the tethers include a winch and a control for the winch. In embodiments, the winch may be operable to reduce the effects of turbulence, for example in response to sudden changes in tension in the tether or sudden changes in vertical position or orientation (heave, pitch, roll, yaw, sway, and surge) of sensors on one or more of the tethers or on the heavier-than-air aircraft. Similar damping of movement caused by turbulence can be achieved by applying greater or lesser power to the rotors of individual VTOL aircraft attached to different locations on the heavier-than-air aircraft or by changing the orientation of those rotors.

In accordance with embodiments, a heavier-than-air aircraft is attached to at least one VTOL aircraft by tethers; the tethers are attached to the heavier-than-air aircraft at points spaced laterally from the center of gravity of the heavier-than-air aircraft, the tethers comprising winches, and a control system programmed to control the direction of flight of the heavier-than-air aircraft by controlling the winches. In embodiments, the heavier-than-air aircraft includes wings, at least two of the VTOL aircraft being connected to wings of the heavier-than-air aircraft. In embodiments, the VTOL aircraft or the winch may be operable to tilt the heavier-than-air aircraft to control its direction of flight in both horizontal and vertical planes. In embodiments, the VTOL aircraft may be attached to control surfaces of the heavier-than-air aircraft to control its direction of flight. The winches may also be utilized as active electro-mechanical shock absorbers; individually controlled by the system's AI software, which may, for example, constantly monitor tension in the tether lines and immediately adjust the length of a line which experiences a sudden change in tension, thereby reducing the effect of turbulence on passengers in the heavier-than-air aircraft.

The use of tethers and winches with VTOL aircraft, and the use of computers to control them, are known per se in the art, as shown, for example, in Lauder et al., U.S. Pat. No. 7,909,398, Buechmiller et al., U.S. Pat. No. 9,688,404, Bialkowski et al., U.S. Published application 2018/0237276, and Prager et al., U.S. Pat. No. 10,793,274.

In accordance with embodiments, a load-lifting swarm of VTOL aircraft, controlled by a master control, is connected to a load for lifting the load. The swarm comprises multiple clusters of three or more VTOL aircraft attached to the same area of the load. In embodiments, the load is a heavier-than-air aircraft. Because the cluster is modular, it allows the use of many small, inexpensive VTOL aircraft to carry a heavy load, offers the safety of redundancy, allows efficient distribution of a fleet of small VTOL aircraft to meet varying payload demands, weather conditions, and the like. The clusters may be homogeneous or may mix different VTOL types, such as winged and without wings. The clusters can morph to accommodate different requirements, even during flight; for example, the number of VTOL aircraft in a cluster may be decreased after take-off and during a horizontal flight. The individual VTOL aircraft in a cluster may be controlled by AI software, in a manner similar to the control of individual UAVs in a UAV lightshow swarm, and the clusters may be coordinated by similar AI software. Such software is well known and is disclosed, for example, in Stark et al, U.S. Pat. No. 9,809,306, Heinonen, U.S. Pat. No. 9,791,859, Dowlatkhah et al., U.S. Pat. No. 9,954,599, Erickson et al., U.S. Pat. No. 10,163,355, and Vaughn et al., U.S. Pat. No. 10,937,324 The clusters may be improved by individual tether inputs, like tether tension and tether angle relative to various relative and absolute coordinate systems. The tethers themselves may include sensors at discrete positions on the tether or extending along the tether.

In accordance with embodiments, a method of transporting a payload in a heavier-than-air aircraft comprises attaching a lift assist comprising at least one VTOL aircraft to the heavier-than-air aircraft by tethers during take-off to lift or assist in lifting the heavier-than-air aircraft to a flight altitude, flying the heavier-than-air aircraft to a destination, and using fewer VTOL aircraft than the lift assist to aid in vertically landing the heavier-than-air aircraft.

The features of the foregoing embodiments, and of the embodiments discussed below may be combined with the features of other embodiments, and all such combinations are intended to be encompassed by the present invention.

The present invention provides an instant passenger capacity increase for any existing VTOL heavier-than-air aircraft. It is especially beneficial for tilt-rotor aircraft and for urban transport VTOL aircraft. It allows fully charged eVTOL aircraft to be summoned to the heavier-than-air aircraft, attach to it, and assist in at least the lift-off phase of flight, thereby conserving battery power in the heavier-than-air aircraft and increasing its range. In an embodiment, the VTOL aircraft fly to a passenger cabin or, attach to the passenger cabin while the tethers are substantially retracted on their winches, land a short distance away from the passenger cabin, then lift off to a substantial height of twenty feet or more, playing out their tether from the winch, then lift the passenger cabin either by rising vertically or by winching in some of the tether. When they have finished their job, they disengage from the passenger cabin and automatically fly to a charging station to await another call.

The combinations and methods of the present invention are advantageous over such prior art as Gamble et al., U.S. Pat. No. 10,933,996, Baharav et al., U.S. Patent Publication 2021/0107653, and Carmack et al., U.S. Pat. No. 9,630,712, in several respects, including, by way of example, superior control of the attitude of the heavier-than-air aircraft, the ability to make flexible use of several relatively small VTOL aircraft, and the ability to use different numbers of VTOL aircraft for take-off and landing.

BRIEF DESCRIPTION OF THE DRAWINGS

In the drawings:

FIG. 1 is a somewhat diagrammatic view in perspective of a first embodiment of a VTOL transport cluster in accordance with the present invention, showing a take-off phase for a wingless heavier-than-air aircraft utilizing a cluster of wingless VTOL aircraft.

FIG. 2 is a somewhat diagrammatic view in perspective of the transport cluster of FIG. 1 in a flight phase.

FIG. 3 is a somewhat diagrammatic view in perspective, corresponding to FIG. 1, of a second embodiment, showing a take-off phase for a winged heavier-than-air aircraft utilizing a cluster of wingless VTOL aircraft.

FIG. 4 is a somewhat diagrammatic view in perspective of the transport cluster of FIG. 3 in transition to a flight phase.

FIG. 5 is a somewhat diagrammatic view in perspective of the transport cluster of FIG. 3 at the beginning of a flight phase.

FIG. 6 is a somewhat diagrammatic view in perspective of the transport cluster of FIG. 3 during a flight phase.

FIG. 7 is a somewhat diagrammatic view in perspective of another embodiment of transport cluster in which a winged heavier-than-air aircraft utilizes a cluster of winged VTOL aircraft.

FIG. 9 is a somewhat diagrammatic view in perspective of an embodiment in which one VTOL aircraft in a series-connected cluster comprises a cluster of VTOL aircraft attached to each other in parallel.

DETAILED DESCRIPTION OF INVENTION

Figure 8:
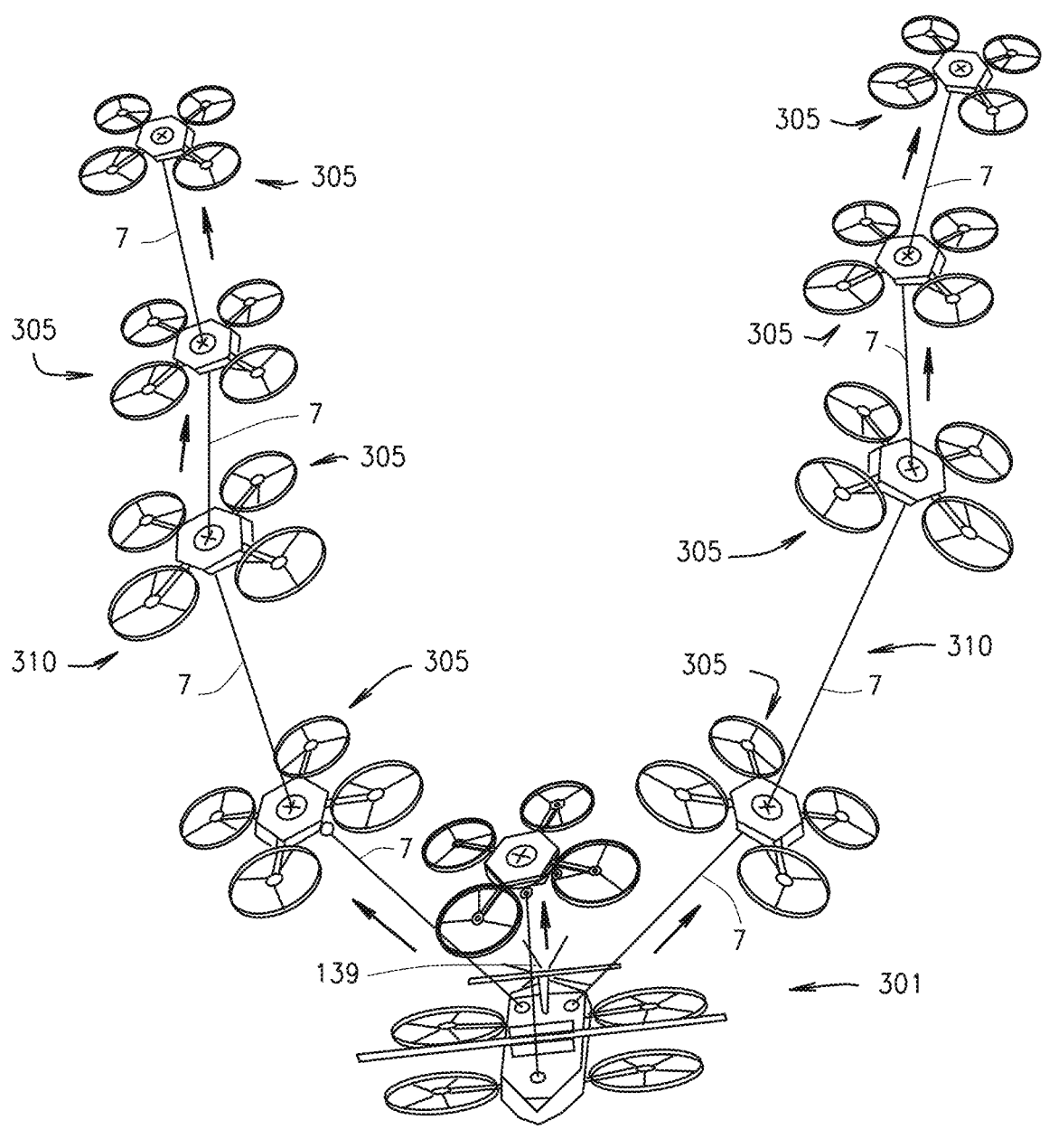
FIG. 8 is a somewhat diagrammatic view of an embodiment in which two of the VTOL aircraft comprise a cluster of VTOL aircraft attached to each other in series.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring now to the drawings, and in particular FIGS. 1 and 2, a simple embodiment of a VTOL transport cluster 1 includes a heavier-than-air aircraft 3 and a cluster of three VTOL unmanned aerial vehicles (UAVs) 5 connected by tethers 7 to three spaced-apart connectors 9 on an upper surface of the heavier-than-air aircraft 3. The heavier-than-air aircraft 3 is illustratively a multirotor electrically powered craft which includes a passenger cabin 31 and multiple rotors 33 attached to the cabin 31. The rotors 33 may or may not provide sufficient lift for take-off of the heavier-than-air aircraft 3, but typically will not provide sufficient lift for a fully loaded cabin 31. Each VTOL aircraft 5 includes a body 51 having multiple rotors 53 attached to the body 51. The body 51 carries a winch 55 controlled by a controller to winch in or winch out the tether 7 wrapped around it. The VTOL aircraft 5 may be smaller than the heavier-than-air aircraft 5, or they may be the same, with the seats removed.

It will be understood that the winches may equally well, in fact preferably, be mounted on the heavier-than-air aircraft 3 at locations 9, and connectors provided on the VTOL aircraft 5.

In use, the heavier-than-air aircraft 3 summons the VTOL aircraft 5. Each VTOL aircraft 5 in turn hovers over the cabin 31 with its tether hanging a short distance over one of the connectors 9. The connectors 9 may include optical targets, homing devices, or magnets, for example, to help guide the lower end of tether 7 into engagement with the connector 9, or the tether 7 may be connected by hand. The VTOL aircraft 5 then flies a short distance off and lands, to allow the next VTOL aircraft 5 to attach. When the heavier-than-air aircraft 3 is ready for take-off, the VTOL aircraft 5 are activated and fly individually to a height at which their downwash does not interfere with efficiency of the rotors 33, typically in excess of twenty feet, playing out their tethers as they rise. FIG. 1 shows the take-off. The three VTOL aircraft 5 take off in a staggered sequence so the pilot, or autopilot, of the heavier-than-air aircraft 3 can pretest each VTOL aircraft 5, tether 7 and winch 55, as well as the communication system with each while the heavier-than-air aircraft, its pilot, and its passengers are still safely on the ground. The heavier-than-air aircraft 3 then slowly lifts itself using the hovering UAV platform and the winches 55. After the heavier-than-air aircraft 3 has risen several meters off the ground, it starts its rotors 33. This prevents downwash from stirring up debris or soil.

The VTOL transport cluster 1 now ascends rapidly to its operating altitude by the combined force of the rotors 33 and 53 and by winching in the tethers 7 to a shorter length.

As shown in FIG. 2, when the VTOL transport cluster 1 has reached its operating altitude, the VTOL aircraft 5 tilt to drive the cluster forward. This approach allows the cabin 31 to remain horizontal without requiring the complex mechanism required for tilting its rotors 33.

When the VTOL transport cluster 1 reaches its destination, the VTOL aircraft 5 return to their upright position in a triangular hover formation as shown in FIG. 1. The winches are operated to lower the heavier-than-air aircraft 3 to the ground, and passengers disembark. The VTOL aircraft 5 disengage from the heavier-than-air aircraft 3 and autonomously fly to charging stations for recharging their batteries. If the heavier-than-air aircraft 3 has not landed near a charging station, it too may autonomously fly to a charging station, with or without the aid of VTOL aircraft 5.

Another embodiment of VTOL transport cluster 101 of the invention is shown in FIGS. 3-6. In this embodiment, the VTOL aircraft 5 are the same as in the first embodiment, but the heavier-than-air aircraft 130 has wings 137 and a push propellor 139. The wings 137 make the heavier-than-air aircraft 130 much more efficient and enable it to travel at higher speeds. In this embodiment, rotors 133 provide enough lift for a smooth landing, but not enough for take-off. Therefore, the take-off phase (FIG. 3) is accomplished in the same manner as in the first embodiment. As shown in FIG. 4, during a transition phase from take-off to horizontal flight, the VTOL aircraft 5 perform in the same way as during the flight phase of the first embodiment. In this embodiment, however, the push propellor 139 is capable of maintaining a speed (about 160 miles per hour (140 knots, 240 KPH)) at which the wings 137 provide sufficient lift to keep the heavier-than-air aircraft 130 airborne. As shown in FIGS. 5 and 6, at this speed the heavier-than-air aircraft 130 can power down its rotors 133, and the VTOL aircraft 5 begin to fall behind. The winches 55 are activated to pull in the tethers 7, and the VTOL aircraft 5 are disconnected and allowed to return to a charging station. When the heavier-than-air aircraft 130 reaches its destination, it powers up its rotors 133 and slows to a speed at which the wings 137 provide little or no lift; the heavier-than-air aircraft 130 then slowly descends to the ground under the control of its rotors 133.

In another embodiment of VTOL transport cluster 201, shown in FIG. 7, both the heavier-than-air aircraft 203 and the VTOL aircraft 205 are provided with wings 237 and 257, respectively. The VTOL aircraft 205 are therefore capable of flying along with the heavier-than-air aircraft 203 after take-off. During flight, all of the rotors 233 and 253 may be deactivated to conserve power.

In this configuration, if three or more VTOL aircraft 205 are connected to the heavier-than-air aircraft 203 at different points, the VTOL aircraft 205 may control pitch, yaw, and roll of the heavier-than-air aircraft 203 directly, by operation of the winches in the tethers 7 or by activating, or controlling the power to, the rotors 253 of one or more of the VTOL aircraft 205.

The VTOL aircraft 205 provide stability during transition from vertical to horizontal flight and from horizontal to vertical flight, when air speed of the heavier-than-air aircraft 203 is insufficient to provide lift from the wings 237 of the heavier-than-air aircraft. On approaching landing, the rotors 233 and 253 are activated and provide lift to the heavier-than-air aircraft 203 as the wings of the craft in the cluster 201 rapidly lose their lift. This added margin of safety is important especially when the heavier-than-air aircraft 203 is a tilt-rotor aircraft.

Each of the VTOL aircraft in any of the configurations described may be replaced by a cluster of smaller VTOL aircraft, connected either in series or in parallel.

For example, in the VTOL transport cluster 301 shown in FIG. 8, two of the VTOL aircraft are replaced by a cluster 310 of smaller VTOL aircraft 305 connected in series. The power applied to each VTOL aircraft 305 is controlled to provide the required lift. If less lift is required after take-off, the cluster 300 may morph by releasing one or more of the VTOL aircraft 305 to return to its base for recharging.

As another example, in the VTOL transport cluster 401 shown in FIG. 9, some or all of the VTOL aircraft may also be replaced by a cluster 410 of VTOL aircraft 405 connected in parallel.

All web sites, publications, patents, and patent applications mentioned herein are hereby incorporated by reference. Any conflicts between material incorporated by reference and the present disclosure shall be resolved in favor of the present disclosure.

In view of the above, it will be seen that the several objects and advantages of the present invention have been achieved and other advantageous results have been obtained.

The invention claimed is:
1. A system comprising,
a heavier-than-air aircraft capable of carrying passengers or cargo, the heavier-than-air aircraft comprising a propulsion system which provides an upward force on the heavier-than-air aircraft while the heavier-than-air aircraft is not moving horizontally;

at least one VTOL aircraft capable of vertical takeoff and landing; and at least one tether connecting the VTOL aircraft to the heavier-than-air aircraft so as to enable the at least one VTOL aircraft to aid in lifting the heavier-than-air aircraft from a stationary position;

wherein the at least one VTOL aircraft capable of vertical takeoff and landing comprise at least three VTOL aircraft attached to the heavier-than-air aircraft by tethers at points spaced from a center of gravity of the heavier-than-air aircraft to permit the at least three VTOL aircraft to control pitch, yaw, and roll of the heavier-than-air aircraft.

2. The system of claim 1 wherein the heavier-than-air aircraft includes wings and wherein the propulsion system of the heavier-than-air aircraft comprises propulsion units pivotable between a vertical orientation and a horizontal orientation, the VTOL aircraft being sized and adapted to support the heavier-than-air aircraft during transition between the orientations.

3. A system comprising, at least three VTOL aircraft and a heavier-than-air aircraft attached to the VTOL aircraft by tethers, the tethers being attached to the heavier-than-air aircraft at points spaced from a center of gravity of the heavier-than-air aircraft, the tethers comprising winches, and a control system programmed to control pitch, yaw, and roll of the heavier-than-air aircraft by controlling the VTOL aircraft, the winches, or both, to maintain the heavier-than-air aircraft substantially level during vertical take-off.

4. The system of claim 3 wherein the heavier-than-air aircraft includes two wings, at least two of the VTOL aircraft being connected to the two wings of the heavier-than-air aircraft.

5. A method of moving a passenger cabin from a first place to a second place comprising:

bringing a cluster of eVTOL aircraft toward the passenger cabin, attaching each eVTOL aircraft to the passenger cabin with a tether wrapped on a winch, after the tether is attached, playing out the tether from the winch while the eVTOL aircraft rises, and after all the eVTOL aircraft have risen, utilizing the eVTOL aircraft to raise or help raise the passenger cabin from the first place, wherein the eVTOL aircraft fly to the passenger cabin in response to a signal.

6. The method of claim 5 wherein the eVTOL aircraft detach from the passenger cabin and automatically fly to a charging station.

7. The method of claim 5 wherein the tethers are attached to the passenger cabin at three or more points spaced around a center of gravity of the passenger cabin to permit the eVTOL aircraft to control pitch, yaw, and roll of the passenger cabin and to maintain the passenger cabin substantially level during vertical take-off.

8. The method of claim 5 wherein at least some of the eVTOL aircraft comprise a cluster of at least three eVTOL aircraft.

* * * * *